(12) United States Patent
Cheng et al.

(10) Patent No.: US 12,452,910 B2
(45) Date of Patent: Oct. 21, 2025

(54) USER EQUIPMENTS, BASE STATIONS, AND METHODS

(71) Applicant: SHARP KABUSHIKI KAISHA, Sakai (JP)

(72) Inventors: Meng Cheng, Sakai (JP); Shohei Yamada, Sakai (JP); Liqing Liu, Sakai (JP); Hiroki Takahashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 345 days.

(21) Appl. No.: 18/266,583

(22) PCT Filed: Dec. 21, 2021

(86) PCT No.: PCT/JP2021/048449
§ 371 (c)(1),
(2) Date: Jun. 9, 2023

(87) PCT Pub. No.: WO2022/138978
PCT Pub. Date: Jun. 30, 2022

(65) Prior Publication Data
US 2024/0049278 A1    Feb. 8, 2024

(30) Foreign Application Priority Data

Dec. 25, 2020 (JP) ................. 2020-216676

(51) Int. Cl.
*H04W 74/00*    (2009.01)
*H04L 5/00*    (2006.01)
(Continued)

(52) U.S. Cl.
CPC ......... *H04W 74/006* (2013.01); *H04L 5/0042* (2013.01); *H04L 5/0051* (2013.01);
(Continued)

(58) Field of Classification Search
None
See application file for complete search history.

(56) References Cited

U.S. PATENT DOCUMENTS

2019/0182870 A1* 6/2019 Shih ................. H04W 72/23
2019/0208550 A1* 7/2019 Ko .................. H04L 5/0053
(Continued)

FOREIGN PATENT DOCUMENTS

WO    2019/140344 A1    7/2019
WO    2019/159294 A1    8/2019

*Primary Examiner* — Faiyazkhan Ghafoerkhan
(74) *Attorney, Agent, or Firm* — ScienBiziP, P.C.

(57) ABSTRACT

A method by a user equipment (UE) is described. The method includes receiving, from a base station, system information including physical random access channel (PRACH) configuration information, wherein the PRACH configuration information includes a list of preamble index ranges, where each preamble index range is associated with a synchronization signal block (SSB), wherein each preamble index range comprises one or a plurality of sub-ranges; and selecting, based on one or a plurality of reference signal received power (RSRP) values of a set of SSBs and a first RSRP threshold configured by a radio resource control (RRC) layer, an SSB from the set of SSBs; and selecting, based on the RSRP value associated with the selected SSB and one or more second RSRP thresholds configured by the RRC layer, a subrange from the one or a plurality of sub-ranges associated with the selected SSB; and selecting a preamble index from the selected sub-range. The first RSRP threshold and the second RSRP threshold(s) are configured by two separate RRC parameters, or configured by one RRC parameter.

7 Claims, 7 Drawing Sheets

(51) Int. Cl.
  *H04W 74/0833* (2024.01)
  *H04W 74/0836* (2024.01)
  *H04W 74/0838* (2024.01)

(52) U.S. Cl.
  CPC .... *H04W 74/0833* (2013.01); *H04W 74/0836* (2024.01); *H04W 74/0838* (2024.01)

(56) References Cited

U.S. PATENT DOCUMENTS

| | | | |
|---|---|---|---|
| 2020/0196356 A1* | 6/2020 | Ko | H04L 5/0053 |
| 2020/0245200 A1* | 7/2020 | Xiong | H04W 76/11 |
| 2021/0168858 A1* | 6/2021 | Liu | H04L 5/0012 |
| 2021/0274538 A1* | 9/2021 | Liu | H04W 72/23 |
| 2021/0289536 A1* | 9/2021 | Liu | H04L 5/0091 |
| 2022/0408474 A1* | 12/2022 | Liu | H04W 72/0446 |
| 2023/0319834 A1* | 10/2023 | Liu | H04W 72/0453 370/329 |
| 2024/0049278 A1* | 2/2024 | Cheng | H04W 74/0833 |

* cited by examiner

USER EQUIPMENTS, BASE STATIONS, AND METHODS

TECHNICAL FIELD

The present disclosure relates to a user equipment, a base station and a method.

BACKGROUND ART

Recently, new wireless network technologies are being developed for the fifth generation (5G) cellular system. The related technical investigations are conducted to drive a standard evolution from the standards of Long Term Evolution (LTE) to the LTEAdvanced Pro (LTE-A Pro) and New Radio (NR) in the 3rd Generation Partnership Project (3GPP).

In the 5G cellular system, three main services are focused on, including the enhanced mobile broadband (eMBB) for achieving a high-speed and large-volume transmission, ultra-reliable and low latency communication (URLLC) for achieving a low-latency and high-reliability communication, and massive machine type communication (mMTC) for achieving a large connection of machine type devices such as Internet of Things (IoT).

For 5G user equipment (UE), initial random access plays an important role in fulfilling the latency requirements. However, for some cell-edge UEs, delay may occur due to the poor connectivity in the random access procedure. To extend the coverage of 5G service, techniques for enhanced coverage UEs are studied. For enhanced coverage UEs, physical random access channel (PRACH) resources should be well designed for UEs with different pathlosses values.

DESCRIPTION OF EMBODIMENTS

Figure 1:
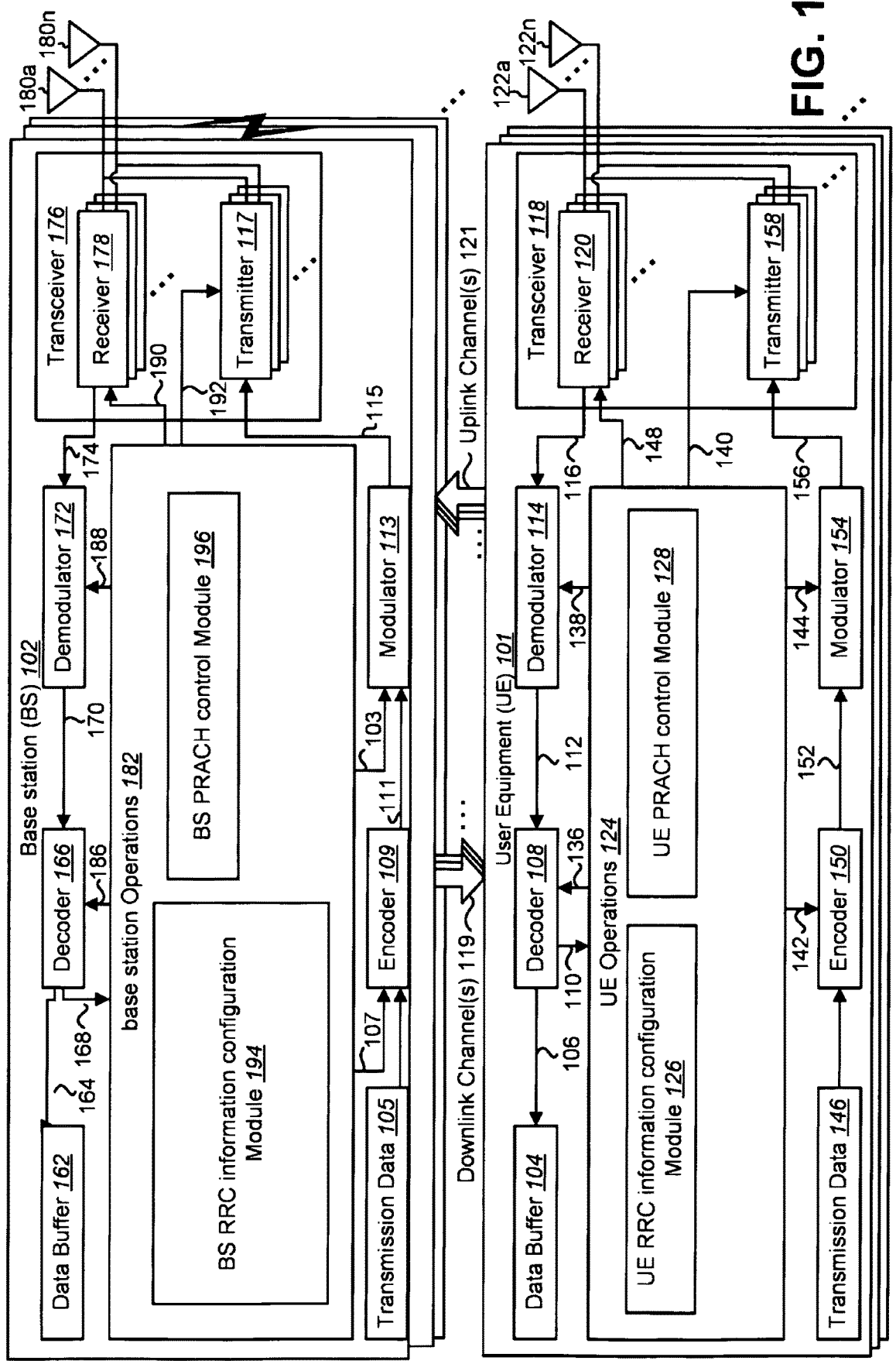
FIG. 1 is a block diagram illustrating one configuration of one or more base stations (BSs) 102 and one or more user equipment (UE) 101, where systems and methods for random access may be implemented.

A method by a user equipment (UE) is described. The method includes receiving, from a base station, system information including physical random access channel (PRACH) configuration information, wherein the PRACH configuration information includes a list of preamble index ranges, where each preamble index range is associated with a synchronization signal block (SSB), wherein each preamble index range comprises one or a plurality of sub-ranges; and selecting, based on one or a plurality of reference signal received power (RSRP) values of a set of SSBs and a first RSRP threshold configured by a radio resource control (RRC) layer, an SSB from the set of SSBs; and selecting, based on the RSRP value associated with the selected SSB and one or more second RSRP thresholds configured by the RRC layer, a sub-range from the one or a plurality of sub-ranges associated with the selected SSB; and selecting a preamble index from the selected sub-range. The first RSRP threshold and the second RSRP threshold(s) are configured by two separate RRC parameters, or configured by one RRC parameter.

A method by a user equipment (UE) is described. The method includes receiving, from a base station, system information including PRACH configuration information, wherein the PRACH configuration information includes a list of preamble index ranges, wherein each preamble index range is associated with an SSB, wherein each preamble index range comprises one or a plurality of sub-ranges; and selecting, based on one or a plurality of RSRP values of a set of SSBs and one or more RSRP thresholds configured by an RRC layer, an SSB from the set of SSBs and a sub-range from the one or a plurality of sub-ranges associated with the selected SSB; and selecting a preamble index from the selected sub-range.

A method by a user equipment (UE) is described. The method includes receiving from a base station, system information including PRACH configuration information, wherein the PRACH configuration information includes a list of preamble index ranges, where each preamble index range is associated with an SSB, wherein each preamble index range comprises one or a plurality of sub-ranges, where each of the sub-ranges for an SSB is associated with a RSRP level; and selecting, from the one or a plurality of RSRP levels, an RSRP level if any RSRP of any SSB exceeds an RSRP threshold corresponding to the RSRP level; and selecting an SSB from the SSBs of which RSRP exceeds the RSRP threshold of the selected RSRP level; and selecting a preamble from a sub-range associated to the selected RSRP level and the selected SSB.

A method by a base station (BS) is described. The method includes transmitting, to a UE, system information including PRACH configuration information, wherein the PRACH configuration information includes a list of preamble index ranges, where each preamble index range is associated with an SSB, wherein each preamble index range comprises one or a plurality of sub-ranges; and providing, for a UE, a first RSRP threshold, and one or more second RSRP thresholds, wherein an SSB is selected by the UE from a set of SSBs, based on one or a plurality of RSRP values of the set of SSBs and the first RSRP threshold, and a sub-range is selected by the UE from the one or a plurality of subranges associated with the selected SSB, based on the RSRP value associated with the selected SSB and the one or more second RSRP thresholds. The first RSRP threshold and the second RSRP threshold(s) are configured by two separate RRC parameters, or configured by one RRC parameter.

A method by a base station (BS) is described. The method includes transmitting, to a UE, system information including PRACH configuration information, wherein the PRACH configuration information includes a list of preamble index ranges, wherein each preamble index range is associated with an SSB, wherein each preamble index range comprises one or a plurality of sub-ranges; and providing, for a UE, one or more RSRP thresholds, wherein an SSB from a set of SSBs, and a sub-range from one or a plurality of sub-ranges associated with the SSB, are selected by the UE, based on one or a plurality of RSRP values of the set of SSBs and the one or more RSRP thresholds.

A method by a base station (BS) is described. The method includes transmitting, to a UE, system information including PRACH configuration information, wherein the PRACH configuration information includes a list of preamble index ranges, wherein each preamble index range is associated with an SSB, wherein each preamble index range comprises one or a plurality of sub-ranges, wherein each of the sub-ranges for an SSB is associated with a RSRP level; and providing, for a UE, one or more RSRP thresholds, wherein an RSRP level is selected by the UE if any RSRP of any SSB exceeds a RSRP threshold corresponding to the RSRP level, and an SSB is selected by the UE from a set of SSBs if the RSRP associated with the SSB exceeds the RSRP threshold of the selected RSRP level.

A UE is described. The UE includes reception circuitry configured to receive, from a base station, system information including physical random access channel (PRACH) configuration information, wherein the PRACH configuration information includes a list of preamble index ranges, where each preamble index range is associated with a synchronization signal block (SSB), wherein each preamble index range comprises one or a plurality of sub-ranges; and control circuitry configured to select, based on one or a plurality of reference signal received power (RSRP) values of a set of SSBs and a first RSRP threshold configured by a radio resource control (RRC) layer, an SSB from the set of SSBs; and to select, based on the RSRP value associated with the selected SSB and one or more second RSRP thresholds configured by the RRC layer, a sub-range from the one or a plurality of sub-ranges associated with the selected SSB; and to select a preamble index from the selected sub-range. The first RSRP threshold and the second RSRP threshold(s) are configured by two separate RRC parameters, or configured by one RRC parameter.

A UE is described. The UE includes reception circuitry configured to receive, from a base station, system information including PRACH configuration information, wherein the PRACH configuration information includes a list of preamble index ranges, wherein each preamble index range is associated with an SSB, wherein each preamble index range comprises one or a plurality of sub-ranges; and control circuitry configured to select, based on one or a plurality of RSRP values of a set of SSBs and one or more RSRP thresholds configured by an RRC layer, an SSB from the set of SSBs and a subrange from the one or a plurality of sub-ranges associated with the selected SSB; and to select a preamble index from the selected sub-range.

A UE is described. The UE includes reception circuitry configured to receive, from a base station, system information including PRACH configuration information, wherein the PRACH configuration information includes a list of preamble index ranges, where each preamble index range is associated with an SSB, wherein each preamble index range comprises one or a plurality of sub-ranges, where each of the sub-ranges for an SSB is associated with a RSRP level; and control circuitry configured to select, from the one or a plurality of RSRP levels, an RSRP level if any RSRP of any SSB exceeds an RSRP threshold corresponding to the RSRP level; and select an SSB from the SSBs of which RSRP exceeds the RSRP threshold of the selected RSRP level; and select a preamble from a sub-range associated to the selected RSRP level and the selected SSB.

A BS is described. The BS includes transmitting circuitry configured to transmit, to a UE, system information including PRACH configuration information, wherein the PRACH configuration information includes a list of preamble index ranges, where each preamble index range is associated with an SSB, wherein each preamble index range comprises one or a plurality of sub-ranges; and control circuitry configured to provide, for a UE, a first RSRP threshold, and one or more second RSRP thresholds, wherein an SSB is selected by the UE from a set of SSBs, based on one or a plurality of RSRP values of the set of SSBs and the first RSRP threshold, and a sub-range is selected by the UE from the one or a plurality of sub-ranges associated with the selected SSB, based on the RSRP value associated with the selected SSB and the one or more second RSRP thresholds. The first RSRP threshold and the second RSRP threshold(s) are configured by two separate RRC parameters, or by one RRC parameter.

A BS is described. The BS includes transmitting circuitry configured to transmit, to a UE, system information including PRACH configuration information, wherein the PRACH configuration information includes a list of preamble index ranges, wherein each preamble index range is associated with an SSB, wherein each preamble index range comprises one or a plurality of sub-ranges; and control circuitry configured to provide, for a UE, one or more RSRP thresholds, wherein an SSB from a set of SSBs, and a subrange from one or a plurality of sub-ranges associated with the SSB, are selected by the UE, based on one or a plurality of RSRP values of the set of SSBs and the one or more RSRP thresholds.

A BS is described. The BS includes transmitting circuitry configured to transmit, to a UE, system information including PRACH configuration information, wherein the PRACH configuration information includes a list of preamble index ranges, wherein each preamble index range is associated with an SSB, wherein each preamble index range comprises one or a plurality of sub-ranges, wherein each of the sub-ranges for an SSB is associated with a RSRP level; and control circuitry configured to provide, for a UE, one or more RSRP thresholds, wherein an RSRP level is selected by the UE if any RSRP of any SSB exceeds a RSRP threshold corresponding to the RSRP level, and an SSB is selected by the UE from a set of SSBs if the RSRP associated with the SSB exceeds the RSRP threshold of the selected RSRP level.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation-Radio Access Network (NGRAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15 and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station (MS), a user equipment (UE), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station (BS) is typically referred to as a Node B, an eNB, a next generation NB (gNB), a transmission and reception point (TRP), an evolved Node B (HeNB) or other terminologies. As the scope of the disclosure should not be limited to 3GPP standards, the terms "Node B", "eNB", "gNB", "TRP" and "HeNB" may be used interchangeably herein to indicate a more general meaning of the BS. Furthermore, one example of a BS is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G-core network (5G-CN). 5G-CN may be called as to NextGen core (NGC), or 5G core (5GC). The BSs may also be connected by the S1 interface to the evolved packet core (EPC). For instance, the BSs may be connected to a NextGen (NG) mobility management function by the NG-2 interface and to the NG core User Plane (UP) functions by the NG-3 interface. The NG interface supports a many-to-many relation between NG mobility management functions, NG core UP functions and the BSs. The NG-2 interface is the NG interface for the control plane and the NG-3 interface is the NG interface for the user plane. For instance, for EPC connection, the BSs may be connected to a mobility management entity (MME) by the S1-MME interface and to the serving gateway (S-GW) by the S1-U interface. The S1 interface supports a many-to-many relation between MMEs, serving gateways and the BSs. The S1-MME interface is the S1 interface for the control plane and the S1-U interface is the S1 interface for the user plane. The UE interface is a radio interface between the UE and the BS for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the BS on the network) may perform functions (e.g., header compression, ciphering, scheduling, ARQ and HARQ) for the user plane. PDCP entities are located in the PDCP sublayer. RLC entities may be in the RLC sublayer. MAC entities may be located in the MAC sublayer. The PHY entities may be in the PHY sublayer.

The control plane may include a control plane protocol stack. The PDCP sublayer (terminated in BS on the network side) may perform functions (e.g., ciphering and integrity protection) for the control plane. The RLC and MAC sublayers (terminated in BS on the network side) may perform the same functions as for the user plane. The Radio Resource Control (RRC) (terminated in BS on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM) IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., BS) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for an RRC reconfiguration message, an RRC reestablishment message, an RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, an RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement. Indication message, a UE Assistance Information message, an In-device Coexistence Indication message, an MBMS Interest Indication message, an SCG Failure Information message. DL-CCCH logical channel may be used (but not limited to) for an RRC Connection Reestablishment message, an RRC Reestablishment Reject message, an RRC Reject message, or an RRC Setup message. UL-CCCH logical channel may be used (but not limited to) for an RRC Reestablishment Request message, or a RRC Setup Request message.

System information may be divided into a MasterInformationBlock (MIB) and a number of SystemInformationBlocks (SIBs).

The UE may receive one or more RRC messages from the BS to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The BS may transmit one or more RRC messages to the UE to cause the UE to configure RRC layer and/or lower layers of the UE according to the RRC configurations or parameters which may be configured by the RRC messages, broadcasted system information, and so on.

FIG. 1 is a block diagram illustrating one configuration of one or more BSs 102 (e.g., eNB, gNB etc.) and one or more user equipment (UE) 101 in which systems and methods for PDCCH repetition in a set of one or more PDCCH monitoring occasions may be implemented. The one or more UEs 101 may communicate with one or more BSs 102 using one or more antennas 122a-n. For example, a UE 101 transmits electromagnetic signals to the BS 102 and receives electromagnetic signals from the BS 102 using the one or more antennas 122a-n. The BS 102 communicates with the UE 101 using one or more antennas 180a-n.

It should be noted that in some configurations, one or more of the UEs 101 described herein may be implemented in a single device. For example, multiple UEs 101 may be combined into a single device in some implementations. Additionally, or alternatively, in some configurations, one or more of the BSs 102 described herein may be implemented in a single device. For example, multiple BSs 102 may be combined into a single device in some implementations. In the context of FIG. 1, for instance, a single device may include one or more UEs 101 in accordance with the systems and methods described herein. Additionally, or alternatively, one or more BSs 102 in accordance with the systems and methods described herein may be implemented as a single device or multiple devices.

The UE 101 and the BS 102 may use one or more channels 119, 121 to communicate with each other. For example, a UE 101 may transmit information or data to the BS 102 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more BSs 102 may also transmit information or data to the one or more UEs 101 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink scheduling grants. The PDCCH is used for transmitting DCI in a case of downlink radio communication (radio communication from the BS to the UE). Here, one or more DCIs (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a nonzero power channel state information reference signal (NZP CSI-RS), and a zero power channel state information reference signal (ZP CSI-RS), etc. Other kinds of channels or signals may be used.

Each of the one or more UEs 101 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 101. For convenience, only a single transceiver 118, decoder 108, demodulator 114, encoder 150 and modulator 154 are illustrated in the UE 101, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the BS 102 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the BS 102 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 101 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 101 to communicate with the one or more BSs 102. The UE operations module 124 may include a UE RRC information configuration module 126. The UE operations module 124 may include a PRACH control module 128. In some implementations, the UE operations module 124 may include physical (PHY) entities, Medium Access Control (MAC) entities, Radio Link Control (RLC) entities, packet data convergence protocol (PDCP) entities, and a Radio Resource Control (RRC) entity. For example, the UE RRC information configuration module 126 may process RRC parameters for random access configurations. The UE PRACH control module 128 may determine PRACH resources for the random access, based on the processing output from the UE RRC information configuration module 126. The UE PRACH control module 128 may select an SSB from a set of SSBs, based on the processing output from the UE RRC information configuration module 126. In this case, the RSRP values of the set of SSBs may be compared with a RSRP threshold for the selection of SSB. The UE PRACH control module 128 may determine a preamble index range associated with the selected SSB, based on the processing output from the UE RRC information configuration module 126. The UE PRACH control module 128 may determine a preamble index sub-range from one or more sub-ranges associated to the selected SSB, based on the processing output from the UE RRC information configuration module 126. In this case, one or more RSRP thresholds for the selection of sub-range may be used.

The UE operations module 124 may provide the benefit of performing UE random access efficiently.

The UE operations module 124 may provide information 148 to the one or more receivers 120. For example, the UE operations module 124 may inform the receiver(s) 120 when or when not to receive transmissions based on the Radio Resource Control (RRC) message (e.g. broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the BS 102.

The UE operations module 124 may provide information 136 to the decoder 108. For example, the UE operations module 124 may inform the decoder 108 of an anticipated encoding for transmissions from the BS 102. For example, the UE operations module 124 may inform the decoder 108 of an anticipated PDCCH candidate encoding with which DCI size for transmissions from the BS 102.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the BS 102. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the BS 102. The one or more transmitters 158 may upconvert and transmit the modulated signal(s) 156 to one or more BSs 102.

The BS 102 may include one or more transceivers 176, one or more demodulators 172, one or more decoders 166, one or more encoders 109, one or more modulators 113, one or more data buffers 162 and one or more BS operations modules 182. For example, one or more reception and/or transmission paths may be implemented in a BS 102. For convenience, only a single transceiver 176, decoder 166, demodulator 172, encoder 109 and modulator 113 are illustrated in the BS 102, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 101 using one or more antennas 180*a-n*. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 101 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The BS 102 may use the decoder 166 to decode signals. The decoder 166 may produce one or more decoded signals 164, 168. For example, a first BS-decoded signal 164 may comprise received payload data, which may be stored in a data buffer 162. A second BS-decoded signal 168 may comprise overhead data and/or control data. For example, the second BS-decoded signal 168 may provide data (e.g., PUSCH transmission data) that may be used by the BS operations module 182 to perform one or more operations.

In general, the BS operations module 182 may enable the BS 102 to communicate with the one or more UEs 101. The BS operations module 182 may include a BS RRC information configuration module 194. The BS operations module 182 may include a BS PRACH control module 196. The BS operations module 182 may include PHY entities, MAC entities, RLC entities, PDCP entities, and an RRC entity.

The BS PRACH control module 196 may determine, for respective UE 101, the PRACH resources for the random access. The BS PRACH control module 196 may determine, for respective UE 101, a threshold for the selection of SSB from a set of SSBs. The BS PRACH control module 196 may determine, for respective UE 101, preamble index range associated with the SSB selected by the UE 101. The BS PRACH control module 196 may determine, for respective UE 101, one or more preamble index subranges of the preamble index range, associated with the selected SSB by the UE 101. The BS PRACH control module 196 may determine, for respective UE 101, one or more thresholds for the selection of preamble index sub-range.

The BS PRACH control module 196 may input the determined information to the BS RRC information configuration module 194. The BS RRC information configuration module 194 may generate RRC parameters, for respective UE 101, with regard to the PRACH resources, based on the output from the BS PRACH control module 196.

The BS operations module 182 may provide the benefit of performing PDCCH candidate search and monitoring efficiently.

The BS operations module 182 may provide information 190 to the one or more receivers 178. For example, the BS operations module 182 may inform the receiver(s) 178 when or when not to receive transmissions based on the RRC message (e.g, broadcasted system information, RRC reconfiguration message), MAC control element, and/or the DCI (Downlink Control Information).

The BS operations module 182 may provide information 188 to the demodulator 172. For example, the BS operations module 182 may inform the demodulator 172 of a modulation pattern anticipated for transmissions from the UE(s) 101.

The BS operations module 182 may provide information 186 to the decoder 166. For example, the BS operations module 182 may inform the decoder 166 of an anticipated encoding for transmissions from the UE(s) 101.

The BS operations module 182 may provide information 107 to the encoder 109. The information 107 may include data to be encoded and/or instructions for encoding. For example, the BS operations module 182 may instruct the encoder 109 to encode transmission data 105 and/or other information 107.

In general, the BS operations module 182 may enable the BS 102 to communicate with one or more network nodes (e.g., a NG mobility management function, a NG core UP functions, a mobility management entity (MME), serving gateway (S-GW), gNBs). The BS operations module 182 may also generate a RRC reconfiguration message to be signaled to the UE 101.

The encoder 109 may encode transmission data 105 and/or other information 107 provided by the BS operations module 182. For example, encoding the data 105 and/or other information 107 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 101.

The BS operations module 182 may provide information 103 to the modulator 113. This information 103 may include instructions for the modulator 113. For example, the BS operations module 182 may inform the modulator 113 of a modulation type (e.g., constellation mapping) to be used for transmissions to the UE(s) 101. The modulator 113 may modulate the encoded data 111 to provide one or more modulated signals 115 to the one or more transmitters 117.

The BS operations module 182 may provide information 192 to the one or more transmitters 117. This information 192 may include instructions for the one or more transmitters 117. For example, the BS operations module 182 may instruct the one or more transmitters 117 when to (or when not to) transmit a signal to the UE(s) 101. The BS operations module 182 may provide information 192, including the PDCCH monitoring occasions and DCI format size, to the one or more transmitters 117. The BS operation module 182 may inform the transmitter(s) 117 when or where to transmit the PDCCH candidate for DCI formats with which DCI size. The one or more transmitters 117 may upconvert and transmit the modulated signal(s) 115 to one or more UEs 101.

It should be noted that one or more of the elements or parts thereof included in the BSs 102 and UEs 101 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A BS may generate an RRC message including the one or more RRC parameters, and transmit the RRC message to a UE. A UE may receive, from a BS, a RRC message including one or more RRC parameters. The term 'RRC parameter(s)' in the present disclosure may be alternatively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a BS may configure a UE to' may also imply/refer to 'a BS may transmit, to a UE, an RRC message including one or more RRC parameters'. Additionally or alternatively, 'RRC parameter configure a UE to' may also refer to 'a BS may transmit, to a UE, an RRC message including one or more RRC parameters'. Additionally, or alternatively, 'a UE is configured to' may also refer to 'a UE may receive, from a BS, an RRC message including one or more RRC parameters'.

A BS may transmit an RRC message including one or more RRC parameters related to Bandwidth part (BWP) configuration to a UE. A UE may receive the RRC message including one or more RRC parameters related to BWP configuration from a BS. For each cell, the BS may configure at least an initial DL BWP and one initial uplink bandwidth parts (initial UL BWP) to the UE. Furthermore, the BS may configure additional UL and DL BWPs to the UE for a cell.

An RRC parameters initialDownlinkBWP may indicate the initial downlink BWP (initial DL BWP) configuration for a serving cell (e.g., a SpCell and Scell). The BS may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and bandwidth of a BWP. A RRC parameters initialUplinkBWP may indicate the initial uplink BWP (initial UL BWP) configuration for a serving cell (e.g., a SpCell and Scell). The BS may transmit initialDownlinkBWP and/or initialUplinkBMP which may be included in SIB1, RRC parameter ServingCellConfigCommon, or RRC parameter ServingCellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter ServingCellConfigCommon is used to configure cell specific parameters of a UE's serving cell. The RRC parameter ServingCellConfig is used to configure (add or modify) the UE with a serving cell, which may be the SpCell or an SCell of an MCS or SCG. The RRC parameter ServingCellConfig herein are mostly UE specific but partly also cell specific.

The BS may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The BS may transmit the BWP-Downlink and the BWPUplink which may be included in RRC parameter ServingCellConfig to the UE.

If a UE is not configured (provided) initialDownlinkBWP from a BS, an initial DL BWP is defined by a location and number of contiguous physical resource blocks (PRBs), starting from a PRB with the lowest index and ending at a PRB with the highest index among PRBs of a CORESET for Type0-PDCCH common search space (CSS) set (i.e., CORESET 0), and a subcarrier spacing (SCS) and a cyclic prefix for PDCCH reception in the CORESET for Type0-PDCCH CSS set. If a UE is configured (provided) initialDownlinkBWP from a BS, the initial DL BWP is provided by initialDownlinkBWP. If a UE is configured (provided) initialUplinkBWP from a BS, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a UE-specific search space (USS) set. A UE may monitor a set of PDCCH candidates in one or more of the following search space sets

- a Type0-PDCCH CSS set configured by pdcch-ConfigSIB1 in MIB or by searchSpaceSIB1 in PDCCH-ConfigCommon or by searchSpaceZero in PDCCHConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCHConfigCommon for a DCI format with CRC scrambled by a RA-RNTI or a TC-RNTI on the primary cell
- a Type2-PDCCH CSS set configured by paging-SearchSpace in PDCCHConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFIRNTI, TPC-PUSCH-RNTI, TPC-PUCCH-RNTI, or TPC-SRS-RNTI and, only for the primary cell, C-RNTI, MCS-C-RNTI, or CS-RNTI(s), and
- a USS set configured by SearchSpace in PDCCH-Config with searchSpaceType=ue-Specific for DCI formats with CRC scrambled by C-RNTI, MCS-C-RNTI, SP-CSIRNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A BS may transmit, to a UE, information to specify one or more CORESET configuration and/or search space configuration. The information may be included in MIB and/or SIBs broadcasted by the BS. The information may be included in RRC configurations or RRC parameters. A BS may broadcast system information such as MIB, SIBs to indicate CORESET configuration or search space configuration to a UE. Or the BS may transmit an RRC message including one or more RRC parameters related to CORESET configuration and/or search space configuration to a UE.

Figure 2:
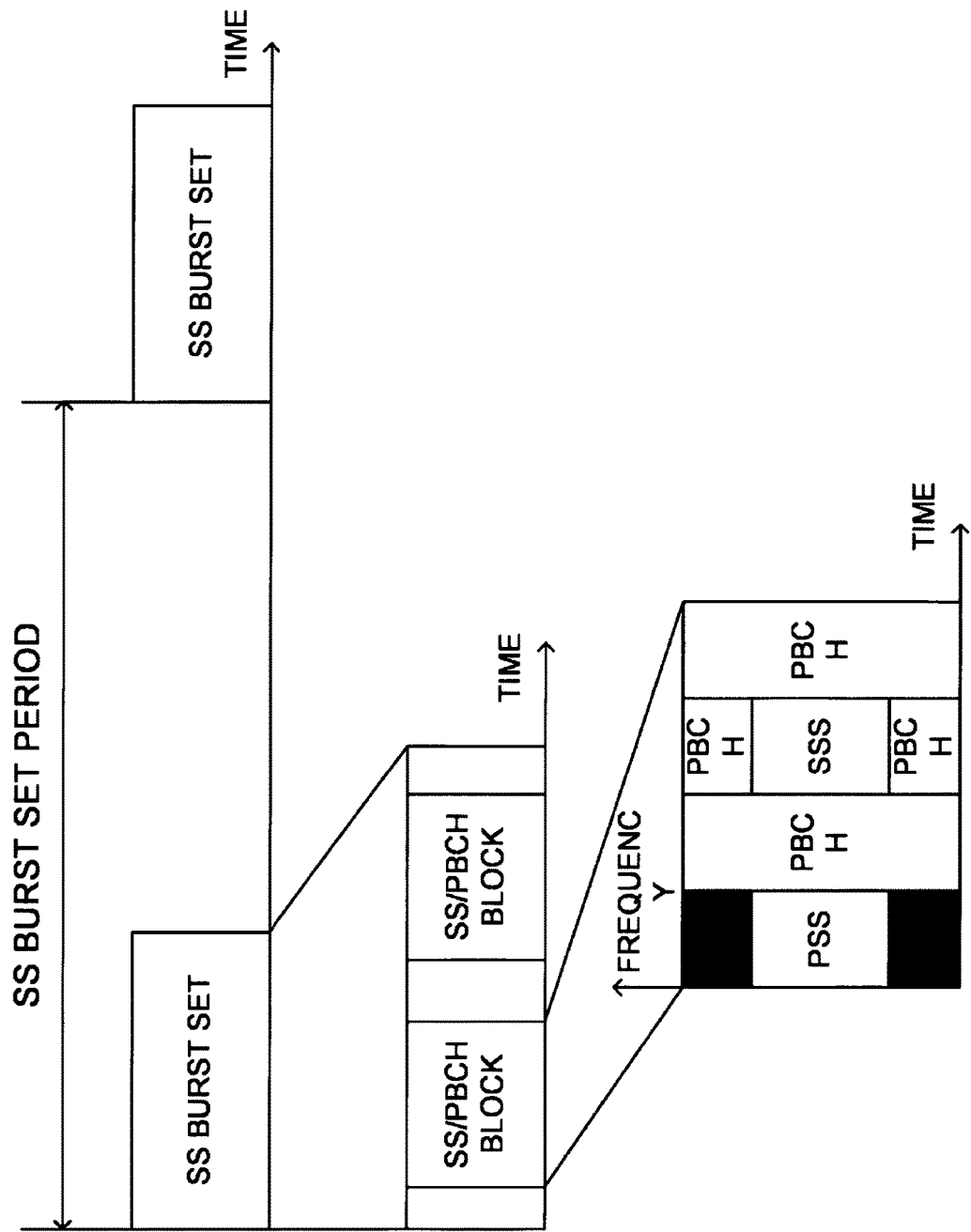
FIG. 2 is a diagram illustrating examples of an SS/PBCH block and an SS burst set according to the embodiment of the present invention.

FIG. 2 is a diagram illustrating examples of an SS/PBCH block (also referred to as a synchronization signal block, an SS block, or SSB) and an SS burst set (also referred to as a synchronization signal burst set) according to the present embodiment. FIG. 2 illustrates an example in which two SS/PBCH blocks are included in the SS burst set periodically transmitted and each SS/PBCH block includes continuous 4 OFDM symbols.

The SS/PBCH block is a unit block including at least synchronization signals (PSS, SSS) and/or the PBCH. Transmission of the signals/channel included in the SS/PBCH block will be expressed as transmission of the SS/PBCH block. In a case that the BS 102 transmits the synchronization signals and/or the PBCH using one or a plurality of SS/PBCH blocks in the SS burst set, the BS 102 may use a downlink transmission beam independent for each SS/PBCH block.

In FIG. 2, the PSS, the SSS, and the PBCH are time/frequency-multiplexed in one SS/PBCH block. However, the order that the PSS, the SSS, and/or the PBCH are multiplexed in time domain may differ from the one in the example illustrated in FIG. 2.

The SS burst set may be periodically transmitted. For example, a period to be used for an initial access and a period configured for the connected UE (Connected or RRC_Connected) may be defined. Also, the period configured for the connected UE (Connected or RRC_Connected) may be configured in the RRC layer. In addition, the period configured for the connected terminal (Connected or RRC_Connected) may be a period of a radio resource in the time domain with a potential of transmission, and in practice, the BS 102 may determine whether to perform transmission. Also, the period used for the initial access may be predefined in specifications or the like.

The SS burst set may be determined based on a System Frame Number (SFN). Also, a start position (boundary) of the SS burst set may be determined based on the SFN and the period.

An SSB index (which may also be referred to as an SSB/PBCH block index) is allocated to the SS/PBCH block in accordance with a temporal position in the SS burst set. The UE 101 calculates the SSB index based on information of the PBCH and/or information of the reference signals included in the detected SS/PBCH block.

The same SSB index is allocated to SS/PBCH blocks with the same relative time in each SS burst set among a plurality of SS burst sets. The SS/PBCH blocks with the same relative time in each SS burst set among the plurality of SS burst sets may be assumed to be QCL (or to which the same downlink transmission beam has been applied). Also, antenna ports of the SS/PBCH blocks with the same relative time in each SS burst set among the plurality of SS burst sets may be assumed to be QCL regarding to an average delay, Doppler shift, and a spatial correlation.

SS/PBCH blocks to which the same SSB index is allocated in a period of a certain SS burst set may be assumed to be QCL in regard to an average delay, an average gain, Doppler spread, Doppler shift, and a spatial correlation. Settings corresponding to one or a plurality of SS/PBCH blocks (or which may be reference signals) that are QCL may be referred to as QCL configurations.

The number of SS/PBCH blocks (which may also be referred to as the number of SS blocks or the number of SSBs), may be defined as the number of SS/PBCH blocks in an SS burst, an SS burst set, or an SS/PBCH block period, for example. Also, the number of SS/PBCH blocks may indicate the number of beam groups for, selecting a cell in the SS burst, the SS burst set, or the SS/PBCH block period. Here, the beam groups may be defined as the number of different SS/PBCH blocks or the number of different beams included in the SS burst, the SS burst set, or the SS/PBCH block period.

The reference signals described below in the present embodiment include a downlink reference signal, a synchronization signal, an SS/PBCH block, a downlink DMRS, a CSI-RS, an uplink reference signal, an SRS, and/or an uplink DM-RS. For example, the downlink reference signal, the synchronization signal, and/or the SS/PBCH block may be referred to as reference signals. The reference signals used in the downlink include a downlink reference signal, a synchronization signal, an SS/PBCH block, a downlink DMRS, a CSI-RS, and the like. The reference signals used in the uplink include an uplink reference signal, an SRS, an uplink DM-RS, and/or the like.

In addition, the reference signal may also be used for Radio Resource Measurement (RRM). The reference signal may also be used for beam management.

The beam management may be a procedure performed by the BS 102 and/or the UE 101 to match directionality between an analog and/or digital beam in a transmission apparatus (the BS 102 in the case of the downlink, or the UE 101 in the case of the uplink) and an analog and/or digital beam of a reception apparatus (the UE 101 in the case of the downlink, or the BS 102 in the case of the uplink) and acquire a beam gain.

Note that the following procedures may be included as a procedure of configuring, configuration, or establishing beam pairing.

Beam selection
Beam refinement
Beam recovery

For example, the beam selection may be a procedure for selecting a beam in communication between the BS 102 and the UE 101. Also, the beam refinement may be a procedure of selecting a beam having a higher gain or changing a beam to an optimum beam between the BS 102 and the UE 101 according to the movement of the UE 101. The beam recovery may be a procedure of re-selecting the beam in a case that the quality of a communication link is degraded due to blockage caused by a blocking object, passing of a person, or the like in communication between the BS 102 and the UE 101.

The beam selection and the beam refinement may be included in the beam management. The beam recovery may include the following procedures.

Detection of beam failure
Discovery of new beam
Transmission of beam recovery request
Monitoring of response to beam recovery request For example, a Reference Signal Received Power (RSRP) of the SSS included in the CSI-RS or the SS/PBCH block may be used, or the CSI may be used, in a case that a transmission beam for the BS 102 is selected in the UE 101. In addition, a CSI-RS Resource Index (CRI) may be used as a report to the BS 102, or an index indicated by a sequence of demodulation reference signals (DMRS) used for demodulating the PBCH and/or the PBCH included in the SS/PBCH block may be used.

Also, the BS 102 indicates a time index of the CRI or the SS/PBCH in a case that a beam is indicated for the UE 101, and the UE 101 performs reception based on the indicated time index of the CRI or the SS/PBCH. At this time, the UE 101 may configure a space filter based on the indicated time index of the CRI or the SS/PBCH and may perform reception. In addition, the UE 101 may perform reception using the assumption of a Quasi Co-Location (QCL). An expression that a certain signal (such as an antenna port, a synchronization signal, or a reference signal) is "QCL" with another signal (such as an antenna port, a synchronization signal, or a reference signal) or an expression that "an assumption of QCL is used" can be interpreted as having a meaning that the certain signal is associated with another signal.

In a case that a Long Term Property of a channel on which a certain symbol in a certain antenna port is carried can be estimated from a channel on which a certain symbol in the other antenna port is carried, it is possible to state that the two antenna ports are QCL. The Long Term Property of the channel includes one or a plurality of delay spread, Doppler spread, Doppler shift, an average gain, and an average delay. In a case that an antenna port 1 and an antenna port 2 are QCL in regard to an average delay, for example, this means that a reception timing for the antenna port 2 can be estimated from a reception timing for the antenna port 1.

The QCL can also be expanded to beam management. For this purpose, spatially expanded QCL may be newly defined. For example, the Long term property of a channel on the assumption of QCL in the space domain may be an arrival angle in a radio link or the channel (such as an Angle of Arrival (AoA) or a Zenith angle of Arrival (ZoA)) and/or an angle spread (for example, Angle Spread of Arrival (ASA) or a Zenith angle Spread of Arrival (ZSA)), a transmission angle (such as AoD or ZoD) or an angle spread of the transmission angle (for example, an Angle Spread of Departure (ASD) or a Zenith angle Spread of Departure (ZSD)), Spatial Correlation, or a reception space parameter.

In a case that the antenna port 1 and the antenna port 2 can be regarded as being QCL in regard to the reception space parameter, for example, this means that a reception beam for receiving a signal from the antenna port 2 can be estimated from a reception beam (reception space filter) for receiving a signal from the antenna port 1.

As QCL types, combinations of long term properties that may be QCL may be defined. For example, the following types may be defined.

Type A: Doppler shift, Doppler spread, average delay, delay spread
Type B: Doppler shift, Doppler spread
Type C: Average delay, Doppler shift
Type D: Receiving space parameter For the aforementioned QCL types, an assumption of QCL between one or two reference signals and the PDCCH or the PDSCH DMRS in the RRC and/or the MAC layer and/or the DCI may be configured and/or indicated as a Transmission Configuration Indication (TCI). In a case that an index #2 of the SS/PBCH block and a QCL type A+QCL type B are configured and/or indicated as one state of the TCI in a case that the UE 101 receives the PDCCH, for example, the UE 101 may receive the DMRS of the PDCCH by regarding it as Doppler shift, Doppler spread in a case of receiving the index #2 of the SS/PBCH block, an average delay, delay spread, a reception space parameter, and a channel long term property and may perform synchronization and carrier path estimation, in a case that the UE 101 receives the PDCCH DMRS. At this time, a reference signal (the SS/PBCH block in the aforementioned example) indicated by the TCI may be referred to as a source reference signal, and a reference signal (the PDCCH DMRS in the aforementioned example) affected by a long term property estimated from the long term property of the channel in a case that the source reference signal is received may be referred to as a target reference signal. Also, one or a plurality of TCI states and a combination of a source reference signal and a QCL type for each state may be configured with the RRC, and the TCI may be indicated in the MAC layer or the DCI for the UE 101.

Operations of the BS 102 and the UE 101 equivalent to the beam management may be defined through assumption of QCL in the space domain and with a radio resource (time and/or frequency) as beam management and beam indication/report by this method.

Hereinafter, the subframe will be described. The subframe referred in the present embodiment may also be referred to as a resource unit, a radio frame, a time section, a time interval, or the like.

Figure 3:
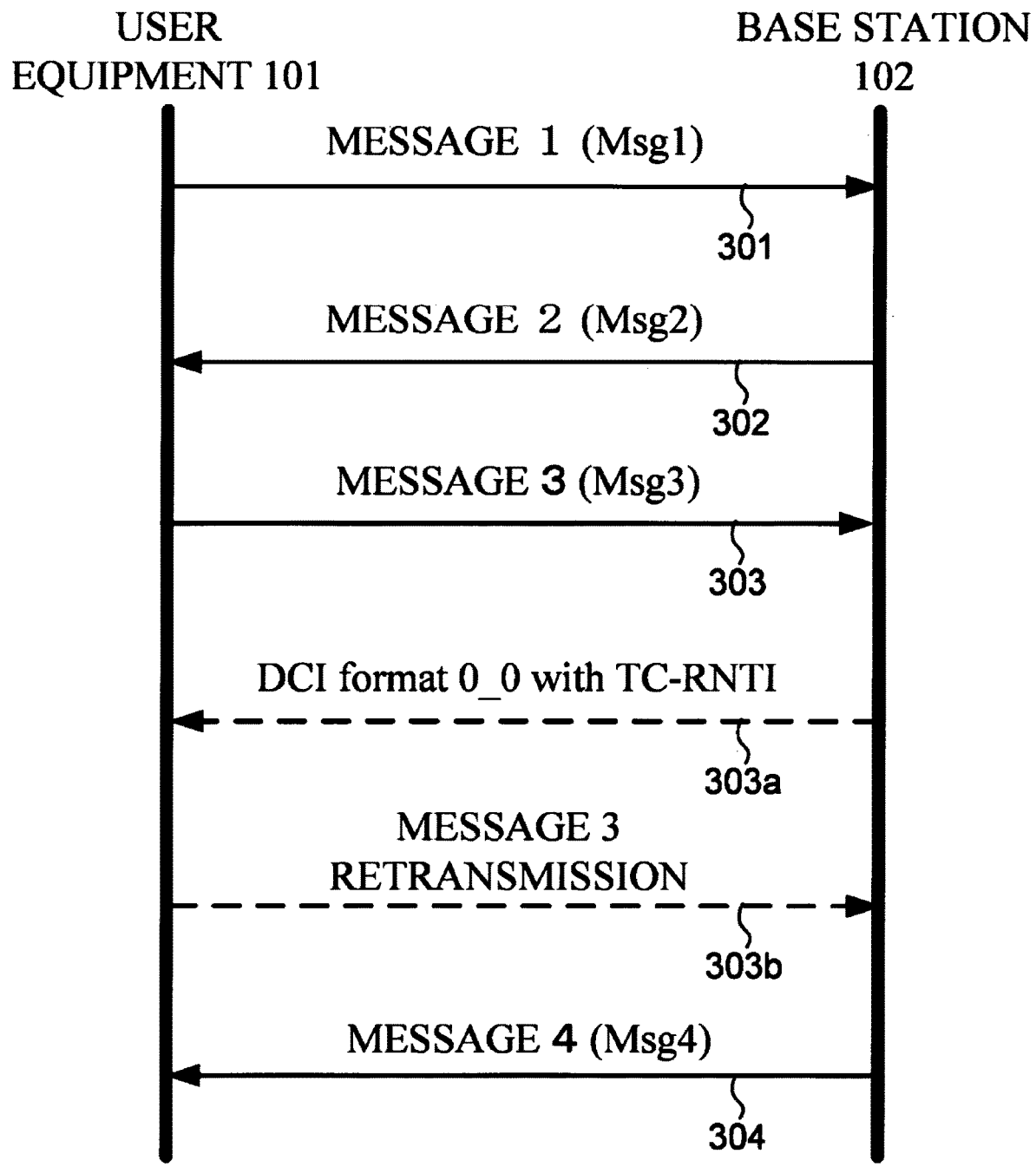
FIG. 3 is a diagram illustrating an example of a random access procedure according to the embodiment of the present invention.

FIG. 3 is a diagram illustrating an example of a random access procedure of the UE 101 according to the present embodiment.

In 301, the UE 101 transmits a random access preamble to the BS 102 via a PRACH. The transmitted random access preamble may be referred to as a message 1 (Msg1). The transmission of the random access preamble will also be referred to as PRACH transmission. The random access preamble is configured to notify information to the BS 102 using one sequence among a plurality of sequences. For example, 64 types (the numbers of random access preamble indexes range from 1 to 64) of sequences are prepared. In a case that 64 types of sequences are prepared, it is possible to indicate 6-bit information (which may be ra-PreambleIndex or a preamble index) for the BS 102. The information may be indicated as a random access preamble identifier (Random Access Preamble Identifier, RAPID).

In a case of a contention-based random access procedure, an index of a random access preamble is randomly selected by the UE 101 itself. In the contention-based random access procedure, the UE 101 selects SS/PBCH blocks that have SS/PBCH block RSRP exceeding a configured threshold value and performs selection of a preamble group. In a case that a relationship between the SS/PBCH block and the random access preamble has been configured, the UE 101 randomly selects ra-PreambleIndex from one or a plurality of random access preambles associated with the selected SS/PBCH block and the selected preamble group and sets selected ra-PreambleIndex to the preamble index (PREAMBLE_INDEX). Also, the selected SS/PBCH block and the selected preamble group may be split into two subgroups based on the transmission size of the Msg3, for example. The UE 101 may randomly select a preamble index from the subgroup corresponding to a small transmission size of the Msg3 303 in a case that the transmission size of the Msg3 303 is small, or may randomly select a preamble index from the subgroup corresponding to a large transmission size of the Msg3 303 in a case that the transmission size of the Msg3 303 is large. The index in the case in which the message size is small is typically selected in a case that properties of the transmission path are poor (or the distance between the UE 101 and the BS 102 is far), and the index in the case in which the message size is large is selected in a case that the properties of the transmission path are good (or the distance between the UE 101 and the BS 102 is close).

In a case of the non-contention-based random access procedure, an index of the random access preamble is selected based on information received by the UE 101 from the BS 102. Here, the information received by the UE 101 from the BS 102 may be included in the PDCCH. In a case that all the values of bits of the information received from the BS 102 are 0, the contention-based random access procedure is executed by the UE 101, and the index of the random access preamble is selected by the UE 101 itself.

Next, the BS 102 that has received the Msg1 301 generates a RAR message including an uplink grant (Random Access Response Grant, RAR UL grant) for indicating transmission for the UE 101 and transmits a random access response including the generated RAR message to the UE 101 in DL-SCH in 302. In other words, the BS 102 transmits, in the PDSCH in a primary cell, the random access response including the RAR message corresponding to the random access preamble transmitted in 301. The PDSCH corresponds to a PDCCH including RA-RNTI. This Ra-RNTI is calculated by RA-RNTI=1+s_id+14×t_id+14×80× f_id+14×80×8×ul_carrier_id. Here, s_id is an index of the first OFDM symbol in the transmitted PRACH and is a value of 0 to 13. t_id is an index of the first slot of the PRACH in the system frame and is a value of 0 to 79. f_id is an index of the PRACH in the frequency domain and is a value of 0 to 7. ul_carrier_id is an uplink carrier used for Msg1 transmission. ul_carrier_id for the NUL carrier is 0 while ul_carrier_id for the SUL carrier is 1.

The random access response may be referred to as a message 2 (Msg2) 302. Also, the BS 102 includes, in the Msg2, a random access preamble identifier corresponding to the received random access preamble and an RAR message (MAC RAR) corresponding to the identifier. The BS 102 calculates a deviation in transmission timing between the UE 101 and the BS 102 from the received random access preamble and includes, in the RAR message, transmission timing adjustment information (Timing Advance (TA) command) for adjusting the deviation. The RAR message includes at least a random access response grant field mapped to the uplink grant, a Temporary Cell Radio Network Temporary Identifier (C-RNTI) field to which Temporary C-RNTI is mapped, and a Timing Advance (TA) command. The UE 101 adjusts the timing of the PUSCH transmission based on the TA command. The timing of the PUSCH transmission may be adjusted for each cell group. The BS 102 includes, in the Msg2 302, the random access preamble identifier corresponding to the received random access preamble.

In order to respond to PRACH transmission, the UE 101 detects (monitors) the DCI format 1_0 to which a CRC parity bit scrambled with the corresponding RA-RNTI is added, during a time period of a random access response window. The time period of the random access response window (window size) is provided by a higher layer parameter ra-ResponseWindow. The window size is the number of slots based on the subcarrier spacing of the Type1-PDCCH common search space.

In a case that the UE 101 detects the DCI format 1_0 to which the CRC scrambled with RA-RNTI is added and the PDSCH including one DL-SCH transport block in the time period of the window, then the UE 101 passes the transport block to the higher layer. The higher layer analyzes the transport block for the random access preamble identifier (RAPID) related to the PRACH transmission. In a case that the higher layer identifies RAPID included in the RAR message of the DL-SCH transport block, the higher layer indicates the uplink grant for the physical layer. The identification means that RAPID included in the received random access response and RAPID corresponding to the transmitted random access preamble are the same. The uplink grant will be referred to as a random access response uplink grant (RAR UL grant) in the physical layer. In other words, the UE 101 can specify the RAR message (MAC RAR) dedicated to itself from the BS 102, by monitoring the random access response (contained in Msg2 302) corresponding to the random access preamble identifier.

In a case that the UE 101 does not detect the DCI format 1_0 to which CRC scrambled with RA-RNTI is added in the time period of the window, or (ii) in a case that the UE 101 does not properly receive the DL-SCH transport block in the PDSCH in the time period of the window, or (iii) in a case that the higher layer does not identify RAPID related to the PRACH transmission, the higher layer provides an indication to transmit the PRACH to the physical layer.

In a case that the random access preamble identifier corresponding to the transmitted random access preamble is included in the received random access response, and the random access preamble has been selected based on the information received by the UE 101 from the BS 102, the UE 101 regards the non-contention-based random access procedure as having successfully been completed and transmits the PUSCH based on the uplink grant included in the random access response.

In a case that the random access preamble identifier corresponding to the transmitted random access preamble is included in the received random access response, and the random access preamble has been selected by the UE 101 itself, TC-RNTI is set to the value of the TC-RNTI field included in the received random access response, and the random access Msg3 303 is transmitted in the PUSCH based on the uplink grant included in the random access response. The PUSCH corresponding to the uplink grant included in the random access response is transmitted in a serving cell in which the corresponding preamble has been transmitted in the PRACH.

The random access process described in FIG. 3 is regarded as a 4-step random access type, which requires two round round-trip transmissions between the UE 101 and the BS 102. To further reduce the latency of the random access process, a 2-step random access may be considered.

For the 2-step random access type, the preamble (Msg1) and the scheduled PUSCH transmission (Msg3) defined in the 4-step type are combined into a single message MsgA. The RAR (Msg2) and the contention resolution message (Msg4) are combined into a single message MsgB.

The MsgA PRACH preambles are separate from the 4-step random access preambles, but can be transmitted in the same PRACH Occasions (ROs) as the preambles of 4-step random access type, or in separate ROs. The PUSCH transmissions are organized into PUSCH Occasions (POs) which span multiple symbols and PRBs with optional guard periods and guard bands between consecutive POs. Each PO consists of multiple DMRS ports and DMRS sequences, with each DMRS port/DMRS sequence pair known as PUSCH resource unit (PRU). The 2-step random access type supports at least one-to-one and multiple-to-one mapping between the preambles and PRUs.

Figure 4:
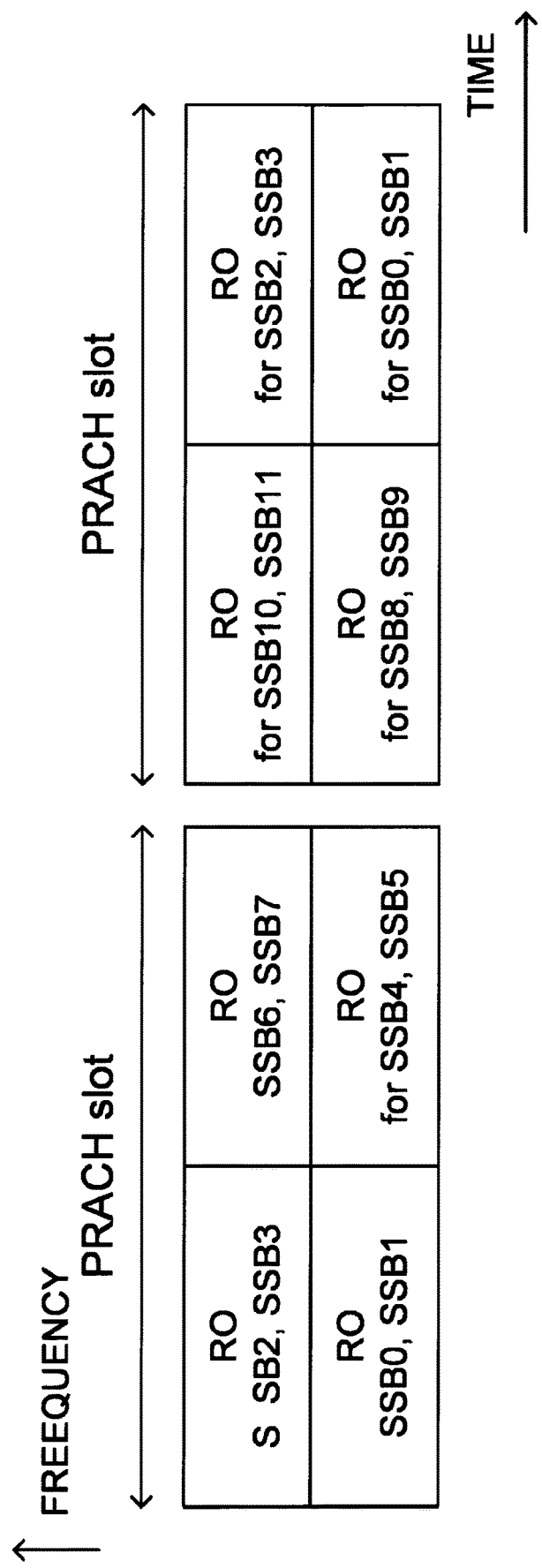
FIG. 4 is a diagram illustrating an example of allocation of SSB indexes to PRACH occasions according to the present embodiment.

FIG. 4 is a diagram illustrating an example of allocation of SSB indexes to PRACH occasions according to the embodiment of the present invention. FIG. 4 illustrates an example of a case in which two PRACH slots are present in a certain time period, two PRACH occasions (RO) in the time direction and two PRACH occasions (RO) in the frequency direction are present in one PRACH slot, and SSB indexes 0 to 11 are present. Two SSB indexes are mapped to one PRACH occasion, the SSB indexes are mapped in accordance with the aforementioned rules (1) to (4), and the SSB indexes are mapped from the SSB index 0 again from the seventh PRACH occasion.

In a case that although the SSB indexes are mapped to each PRACH occasion, all the SSB indexes (all SS/PBCH blocks transmitted by the BS 102) are not mapped even in a case that all the PRACH occasions in a PRACH configuration period specified by prach-ConfigIndex are used, the SSB indexes may be mapped over a plurality of PRACH configuration periods. However, the entire number of SS/PBCH blocks transmitted by the BS 102 may be indicated by a higher layer parameter. The period at which the PRACH configuration period is repeated a predetermined number of times such that all the SSB indexes are mapped at least once will be referred to as an association period. As the number of times the PRACH configuration period configuring the association period is repeated, a minimum value that satisfies the conditions, as mentioned before, in a predefined set of a plurality of values may be used. The predefined set of a plurality of values may be defined for each PRACH configuration period. However, in a case that all the SSB indexes are mapped to the PRACH occasions in the association period, and the number of remaining PRACH occasions is greater than the number of SS/PBCH blocks, the SSB indexes may be mapped again. However, in a case that all the SSB indexes are mapped to the PRACH occasions in the association period, and the number of remaining PRACH occasions is smaller than the number of SS/PBCH blocks, the SSB indexes may not be mapped to the remaining PRACH occasions. A cycle at which the PRACH occasions are allocated to all the SSB indexes once will be referred to as an SSB index allocation cycle. In a case that SSB-perRACH-Occasion is equal to or greater than 1, each of the SSB indexes is mapped to one PRACH occasion in one SSB index allocation cycle. In a case that SSB-perRACH-Occasion is a value that is smaller than 1, each SSB index is mapped to 1/SSB-perRACH-Occasion PRACH occasions in one SSB index allocation cycle. The UE 101 may specify the association period based on the PRACH configuration period indicated by the PRACH configuration index and the number of SS/PBCH blocks specified by the higher parameter provided by the higher layer (higher layer signal).

Each of one or a plurality of random access preamble groups included in random access configuration information may be associated for each reference signal (for example, an SS/PBCH block, a CSI-RS, or a downlink transmission beam). The UE 101 may select a random access preamble group based on the received reference signal (for example, the SS/PBCH block, the CSI-RS, or the downlink transmission beam).

However, the random access preamble group associated with each SS/PBCH block may be specified by one or a plurality of parameters notified from the higher layer. The one parameter or one of the plurality of parameters may be one index (for example, a start index) of one or a plurality of available preambles. The one parameter or the one of the plurality of parameters may be the number of preambles that can be used for a contention-based random access per SS/PBCH block. The one parameter or the one of the plurality of parameters may be a total of the number of preambles that can be used for the contention-based random access per SS/PBCH block and the number of preambles that can be used for the non-contention-based random access. The one parameter or the one of the plurality of parameters may be the number of SS/PBCH blocks associated with one PRACH occasion.

However, the UE 101 may receive one or a plurality of downlink signals, each of which is transmitted using one downlink transmission beam, receive random access configuration information associated with one of the downlink signals, and perform the random access procedure based on the received random access configuration information. The UE 101 may receive one or a plurality of SS/PBCH blocks in the SS burst set, receive random access configuration information associated with one of the SS/PBCH blocks, and perform the random access procedure based on the received random access configuration information. The UE 101 may receive one or a plurality of CRI-RSs, receive random access configuration information associated with one of the CRI-RSs, and perform the random access procedure based on the received random access configuration information.

One or a plurality of pieces of random access configuration information may include one random access channel configuration (RACH-Config) and/or one physical random access channel configuration (PRACH-Config).

Parameters related to the random access for each reference signal may be included in the random access channel configuration.

Parameters (such as an index of PRACH configuration, a PRACH occasion, and the like) related to the physical random access channel for each reference signal may be included in the physical random access channel configuration.

One piece of random access configuration information may indicate parameters related to a random access corresponding to one reference signal, and a plurality of pieces of random access configuration information may indicate parameters related to a plurality of random accesses corresponding to a plurality of reference signals.

One piece of random access configuration information may indicate parameters related to a physical random access corresponding to one reference signal, and may indicate parameters related to a plurality of random accesses corresponding to a plurality of reference signals.

Random access configuration information corresponding to a reference signal (random access channel configuration corresponding to the reference signal, physical random access channel configuration corresponding to the reference signal) may be selected in response to selection of the corresponding reference signal.

However, the UE 101 may receive one or a plurality of pieces of random access configuration information from a BS 102 that transmits the random access preamble and/or a BS 102 that is different from the transmission reception points 4 and/or the transmission reception points 4. For example, the UE 101 may transmit the random access preamble to a second BS 102 based on at least one piece of random access configuration information received from a first BS 102.

However, the BS 102 may determine the downlink transmission beam to be applied in a case that the downlink signal is transmitted to the UE 101, by receiving the random access preamble transmitted by the UE 101. The UE 101 may transmit the random access preamble using a PRACH occasion indicated by the random access configuration information associated with a certain downlink transmission beam. The BS 102 may determine the downlink transmission beam to be applied in a case that the downlink signal is transmitted to the UE 101, based on the random access preamble received from the UE 101 and/or the PRACH occasion in which the random access preamble is received.

The BS 102 transmits an RRC parameter including one or a plurality of pieces of random access configuration information (which may include random access resources) as an RRC message to the UE 101.

The UE 101 may select one or a plurality of available random access preambles and/or one or a plurality of available PRACH occasions used for the random access procedure based on properties of a transmission path with the BS 102.

The UE 101 may select one or a plurality of available random access preambles and/or one or a plurality of PRACH occasions used for the random access procedure based on properties of the transmission path (which may be a RSRP, for example) measured by a reference signal (an SS/PBCH bock and/or a CSI-RS, for example) received from the BS 102.

Figure 5:
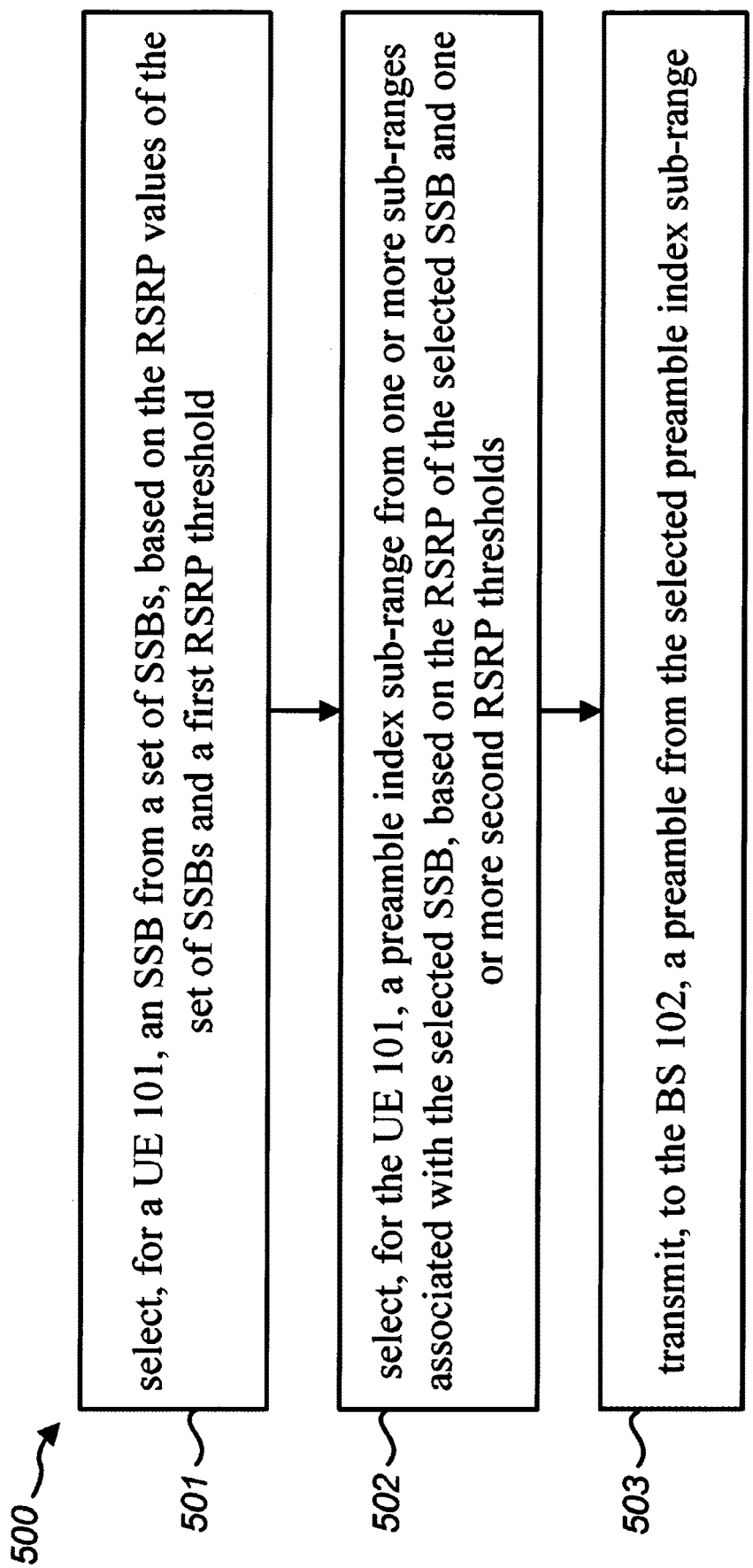
FIG. 5 is a flow diagram illustrating one implementation of a method 500 for determining a preamble index for a UE 101.

FIG. 5 is a flow diagram illustrating one implementation of a method 500 for determining a preamble index for a UE 101.

In the implementation of the present disclosure, the UE 101 may first receive RSRP values of a set of SSBs, based on which one SSB is selected. A first RSRP threshold may be provided for the selection of the SSB. The first RSRP threshold may be configured by the RRC parameter "rsrp-ThresholdSSB" in the 4-step random access type. Alternatively, the first RSRP threshold may be configured by the RRC parameter "msgARSRP-ThresholdSSB" in the 2-step random access type. Alternatively, the first RSRP threshold may be configured by another RRC parameter.

An SSB may be selected 501 by the UE 101 if the RSRP associated with the SSB is larger than the first RSRP threshold. If more than one SSBs have their RSRP values larger than the first RSRP threshold, any of them may be selected by the UE 101, or alternatively the SSB with the highest RSRP value may be selected by the UE 101. If the RSRP values of all SSBs are less than the first RSRP threshold, an SSB with the highest RSRP value may be selected by the UE 101, or alternatively, any SSB may be randomly selected by the UE 101.

Each of the SSBs is associated with a preamble index range, determined by RRC information. Furthermore, the preamble index range associated with an SSB may be divided into one or more sub-ranges. One of the sub-ranges may be the contention-based (CB) preamble index range. The determination of this CB preamble index sub-range may include a number of SSBs per RACH occasion and a number of contention-based (CB) preamble indexes, configured by the RRC parameter "ssb-perRACH-OccasionAndCB-PreamblesPerSSB" in a 4-step random access type. Alternatively, "msgA-SSB-PerRACHOccasionAndCB-PreamblesPerSSB" may be used to define the number of SSBs mapped to each PRACH occasion for 2-step RA type and the number of contention-based Random Access Preambles mapped to each SSB. Alternatively, "msgA-CB-PreamblesPerSSBPerSharedRO" may be used to define the number of contention-based Random Access Preambles for 2-step RA type mapped to each SSB when the PRACH occasions are shared between 2-step and 4-step RA types.

The UE 101 may select 502 one preamble index sub-range from one or more sub-ranges associated to the selected SSB, based on the RSRP of the selected SSB and one or more second RSRP thresholds. For example, there is 1 RSRP threshold configured for the selection of two preamble index sub-ranges. If the RSRP of the selected SSB is less than the RSRP threshold, the first sub-range is selected. Otherwise, the second subrange is selected. In another example, there are 2 RSRP thresholds configured for the selection of three sub-ranges. If the RSRP of the selected SSB is less than the first RSRP threshold, the first sub-range is selected. Otherwise, if the RSRP is less than the second RSRP threshold, the second sub-range is selected. Otherwise the third sub-range is selected. In another example, there is no RSRP threshold configured for the selection of sub-range, and the preamble index range associated with the selected SSB will not be divided, or can be regarded as only one sub-range.

The first RSRP threshold and the second RSRP threshold(s) may be configured by two separate RRC parameters, or alternatively by one RRC parameter.

The UE 101 may select one preamble from the selected preamble index subranges, and transmit 503 it as the Msg1 301 to the BS 102 during the 4-step random access procedure, or alternatively transmit it as the Msg A to the BS 102 during the 2-step random access procedure.

Figure 6:
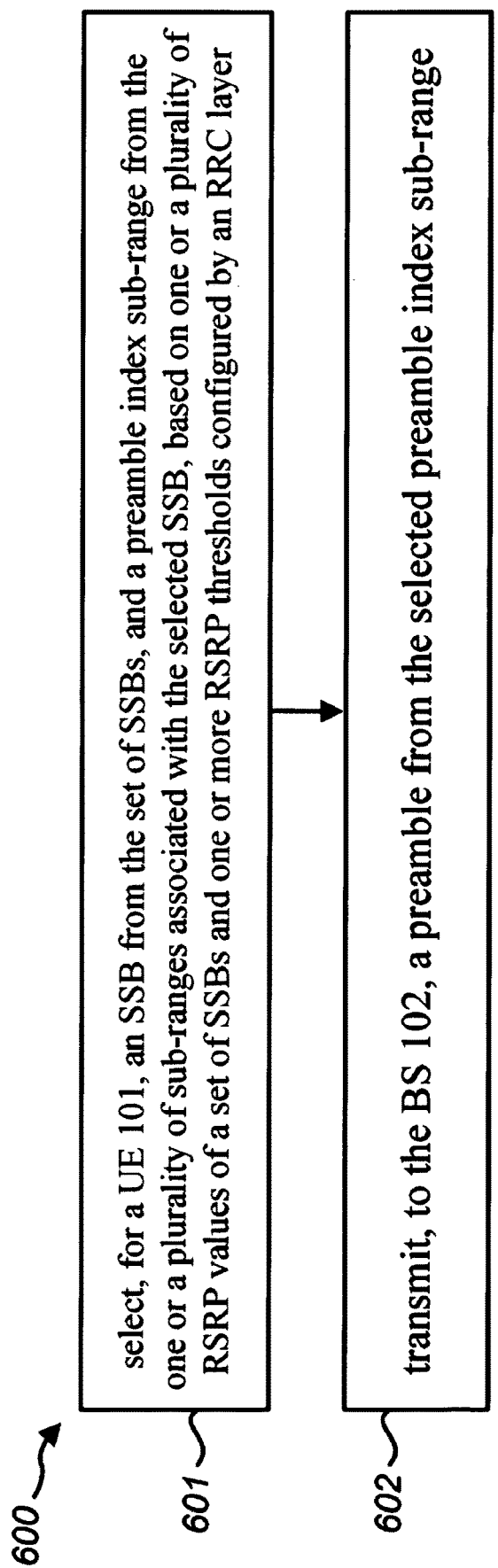
FIG. 6 is a flow diagram illustrating one implementation of a method 600 for determining a preamble index for a UE 101.

FIG. 6 is a flow diagram illustrating one implementation of a method 600 for determining a preamble index for a UE 101.

In the implementation of the present disclosure, the UE 101 may first receive RSRP values of a set of SSBs. Each SSB is associated with a preamble index range, configured by the RRC information. Furthermore, the preamble index range associated with each SSB may be divided into one or more sub-ranges.

The UE may be provided with one or more RSRP thresholds configured by the RRC layer. The UE may select one SSB from a set of SSBs, based on the one or a plurality of RSRP values of the set of SSBs and one or more RSRP thresholds configured by the RRC layer. The UE may select one preamble index sub-range from one or a plurality of sub-ranges associated with the selected SSB, based on the RSRP value of the selected SSB and one or more RSRP thresholds configured by the RRC layer.

An SSB may be selected 601 by the UE 101 if the RSRP associated with the SSB is larger than the highest value of the one or more RSRP thresholds. Alternatively, an SSB may be selected by the UE 101 if the RSRP associated with the SSB is the largest among those which are higher than the minimum value of the one or more RSRP thresholds.

Alternatively, an SSB may be selected by the UE 101 if the RSRP associated with the SSB is the largest among all RSRP values of the set of SSBs. In an example, the RSRP threshold includes three values, i.e., 1, 2 and 3, corresponding to the Threshold 1, Threshold 2 and Threshold 3, respectively. There are four RSRP values, i.e., 0.5, 1.5, 2.5 and 3.5, corresponding to SSB1, SSB2, SSB3 and SSB4. In this case, SSB4 is selected, since the RSRP of SSB4 is larger than Threshold 3 (the largest threshold). In another example, the RSRP threshold includes three values, i.e., 1, 2 and 3, corresponding to the Threshold 1, Threshold 2 and Threshold 3, respectively. There are four RSRP values, i.e., 0.5, 1.5, 2.5 and 2.8, corresponding to SSB1, SSB2, SSB3 and SSB4. In this case, there is no SSB with the RSRP larger than Threshold 3 (the largest threshold). However, SSB2, SSB3 and SSB4 have the RSRP values larger than the lowest RSRP threshold (Threshold 1). Then, SSB4 is selected because the RSRP of SSB4 is the largest among the RSRPs of SSB2, SSB3 and SSB4.

The UE 101 may select 601 one preamble index sub-range from one or more sub-ranges associated to the selected SSB, based on the RSRP of the selected SSB and one or more RSRP thresholds. The RSRP of the selected SSB can be higher than the largest threshold of the one or more RSRP thresholds, or lower than the smallest threshold of the one or more RSRP thresholds, or between two thresholds of the RSRP thresholds, where for each case a sub-range is mapped. In one example, the RSRP threshold includes two values, i.e., 1 and 2, corresponding to the Threshold 1 and Threshold 2, respectively. If the RSRP of the selected SSB is 2.5, which is larger than Threshold 2, the first subrange is selected; if the RSRP of the selected SSB is 1.5, which is between Threshold 1 and Threshold 2, the second sub-range is selected; If the RSRP of the selected SSB is 0.5, which is lower than Threshold 1, the third sub-range is selected.

The UE 101 may select one preamble from the selected preamble index subranges, and transmit 602 it as the Msg1 301 to the BS 102 during the 4-step random access procedure, or alternatively transmit it as the Msg A to the BS 102 during the 2-step random access procedure.

Figure 7:
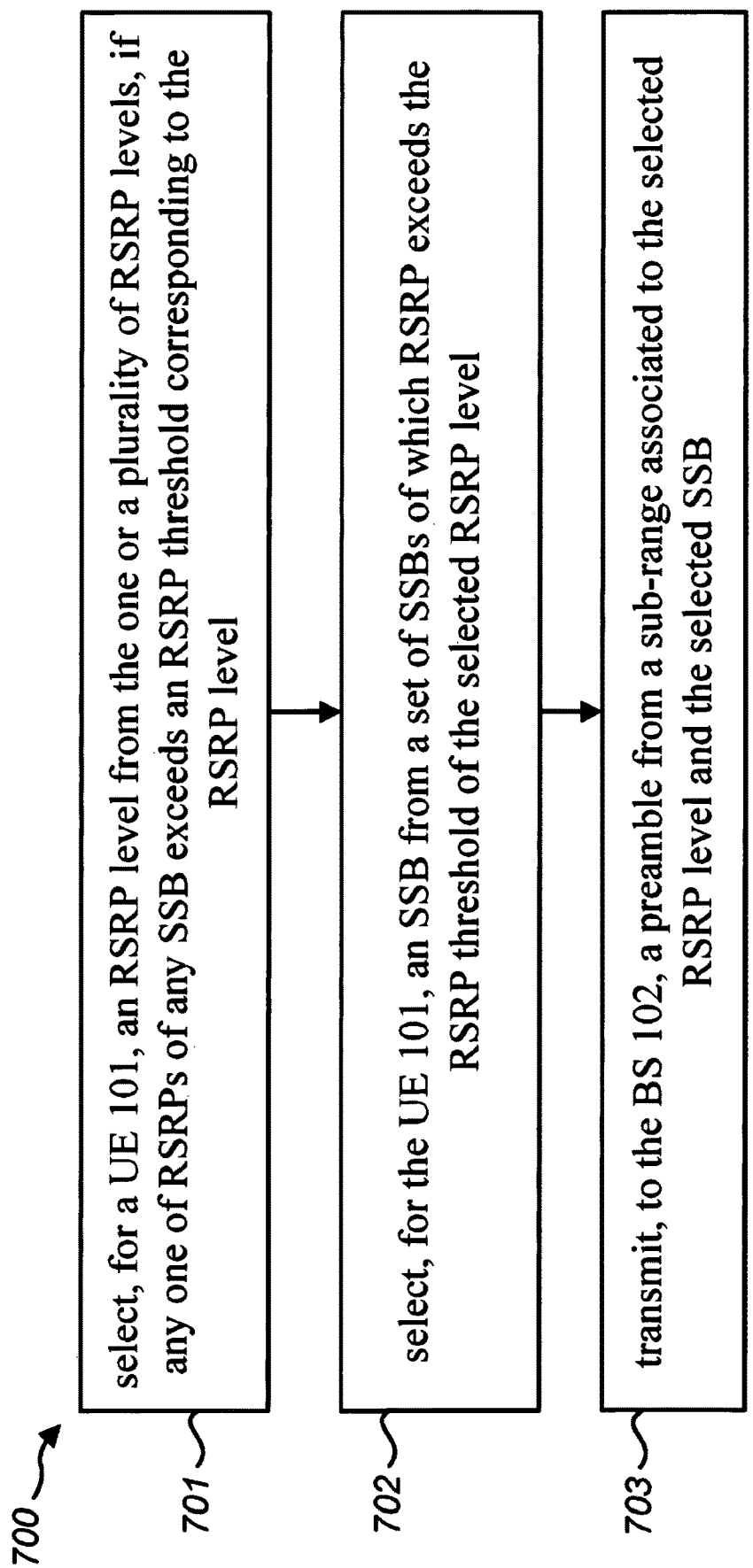
FIG. 7 is a flow diagram illustrating one implementation of a method 700 for determining a preamble index for a UE 101.

FIG. 7 is a flow diagram illustrating one implementation of a method 700 for determining a preamble index for a UE 101.

In the implementation of the present disclosure, the UE 101 may first receive RSRP values of a set of SSBs. Each SSB is associated with a preamble index range, configured by the RRC information. Furthermore, the preamble index range associated with each SSB may be divided into one or more sub-ranges.

The UE 101 may be provided with one or more RSRP thresholds configured by the RRC layer. Each of the RSRP thresholds corresponds to an RSRP level. Alternatively, each of the RSRP thresholds corresponds to a level which is determined at least based on the RSRP values. Each of the RSRP levels corresponds to a preamble index sub-range.

The UE 101 may select an RSRP level from the one or a plurality of RSRP levels, if any RSRP of any SSB exceeds an RSRP threshold corresponding to the RSRP level. There may be an additional RSRP level associated to the case where no RSRP is larger than the lowest RSRP threshold. In an example, the RSRP threshold includes two values, i.e., 1 and 2, corresponding to the Threshold 1 and Threshold 2, based on which three RSRP levels can be defined. If there is at least one RSRP value larger than Threshold 2, the first RSRP level is selected; If there is no RSRP value larger than Threshold 2, but at least one RSRP value between Threshold 1 and Threshold 2, the second RSRP level is selected; if there is no RSRP value larger than Threshold 1, the third RSRP level is selected.

The UE may select one SSB from a set of SSBs, based on the one or a plurality of RSRP values of the set of SSBs and the one or more RSRP thresholds. An SSB may be selected 701 by the UE 101 if the RSRP associated with the SSB is larger than the highest value of the one or more RSRP thresholds. Alternatively, an SSB may be selected by the UE 101 if the RSRP associated with the SSB is the largest among those which are higher than the minimum value of the one or more RSRP thresholds. Alternatively, an SSB may be selected by the UE 101 if the RSRP associated with the SSB is the largest among all RSRP values of the set of SSBs. In an example, the RSRP threshold includes three values, i.e., 1, 2 and 3, corresponding to the Threshold 1, Threshold 2 and Threshold 3, respectively. There are four RSRP values, i.e., 0.5, 1.5, 2.5 and 3.5, corresponding to SSB1, SSB2, SSB3 and SSB4. In this case, SSB4 is selected, since the RSRP of SSB4 is larger than Threshold 3 (the largest threshold). In another example, the RSRP threshold includes three values, i.e., 1, 2 and 3, corresponding to the Threshold 1, Threshold 2 and Threshold 3, respectively. There are four RSRP values, i.e., 0.5, 1.5, 2.5 and 2.8, corresponding to SSB1, SSB2, SSB3 and SSB4. In this case, there is no SSB with the RSRP larger than Threshold 3 (the largest threshold). However, SSB2, SSB3 and SSB4 have the RSRP values larger than the lowest RSRP threshold (Threshold 1). Then, SSB4 is selected because the RSRP of SSB4 is the largest among the RSRPs of SSB2, SSB3 and SSB4.

The UE 101 may select 702 one preamble index sub-range from one or more sub-ranges associated to the selected SSB, where the sub-range is associated with the selected RSRP level.

The UE 101 may select one preamble from the selected preamble index subranges, and transmit 703 it as the Msg1 301 to the BS 102 during the 4-step random access procedure, or alternatively transmit it as the Msg A to the BS 102 during the 2-step random access procedure.

The invention claimed is:

1. A user equipment (UE), comprising:
reception circuitry configured to receive, from a base station, system information including physical random access channel (PRACH) configuration information, wherein
the PRACH configuration information includes a list of preamble index ranges, where each preamble index range is associated with a synchronization signal block (SSB), wherein
each preamble index range comprises one or a plurality of sub-ranges; and
control circuitry configured to select, based on one or a plurality of reference signal received power (RSRP) values of a set of SSBs and a first RSRP threshold configured by a radio resource control (RRC) layer, an SSB from the set of SSBs; and to select, based on the RSRP value associated with the selected SSB and one or more second RSRP thresholds configured by the RRC layer, a sub-range from the one or a plurality of sub-ranges associated with the selected SSB; and to select a preamble index from the selected sub-range.

2. The UE according to claim 1: wherein the first RSRP threshold and the second RSRP threshold(s) are configured by two separate RRC parameters, respectively.

3. The UE according to claim 1: wherein the first RSRP threshold and the second RSRP threshold(s) are configured by one RRC parameter.

4. A base station (BS), comprising:
transmitting circuitry configured to transmit, to a UE, system information including PRACH configuration information, wherein
the PRACH configuration information includes a list of preamble index ranges, where each preamble index range is associated with an SSB, wherein
each preamble index range comprises one or a plurality of sub-ranges; and
control circuitry configured to provide, for a UE, a first RSRP threshold, and one or more second RSRP thresholds, wherein
an SSB is selected by the UE from a set of SSBs, based on one or a plurality of RSRP values of the set of SSBs and the first RSRP threshold, and
a sub-range is selected by the UE from the one or a plurality of sub-ranges associated with the selected SSB, based on the RSRP value associated with the selected SSB and the one or more second RSRP thresholds.

5. The BS according to claim 4: wherein the first RSRP threshold and the second RSRP threshold(s) are configured by two separate RRC parameters.

6. The BS according to claim 4: wherein the first RSRP threshold and the second RSRP threshold(s) are configured by one RRC parameter.

7. A method performed by a BS, comprising:
transmitting, to a UE, system information including PRACH configuration information, wherein
the PRACH configuration information includes a list of preamble index ranges, where each preamble index range is associated with an SSB, wherein
each preamble index range comprises one or a plurality of sub-ranges; and
providing, for a UE, a first RSRP threshold, and one or more second RSRP thresholds, wherein
an SSB is selected by the UE from a set of SSBs, based on one or a plurality of RSRP values of the set of SSBs and the first RSRP threshold, and a sub-range is selected by the UE from the one or a plurality of sub-ranges associated with the selected SSB, based on the RSRP value associated with the selected SSB and the one or more second RSRP thresholds.

* * * * *